(12) United States Patent
Graeve et al.

(10) Patent No.: US 7,451,686 B2
(45) Date of Patent: Nov. 18, 2008

(54) FLUID SYSTEM WITH SIGNAL-MIMICKING DEVICE AND ASSOCIATED METHOD

(75) Inventors: Joshua Dean Graeve, Epworth, IA (US); Eric Richard Anderson, Galena, IL (US); Mark Edward Breutzman, Potosi, IA (US)

(73) Assignee: Deere & Company, Moline, IL (US)

( * ) Notice: Subject to any disclaimer, the term of this patent is extended or adjusted under 35 U.S.C. 154(b) by 280 days.

(21) Appl. No.: 11/510,099

(22) Filed: Aug. 25, 2006

(65) Prior Publication Data

US 2008/0047423 A1    Feb. 28, 2008

(51) Int. Cl.
*F15B 13/02* (2006.01)
*F16D 31/02* (2006.01)

(52) U.S. Cl. .......................................... 91/516; 60/422
(58) Field of Classification Search .................... 60/384, 60/385, 422, 426; 91/516
See application file for complete search history.

(56) References Cited

U.S. PATENT DOCUMENTS

| | | | |
|---|---|---|---|
| 3,915,253 A | 10/1975 | Ott et al. | |
| 4,044,786 A | 8/1977 | Yip | |
| 4,354,351 A | 10/1982 | Dezelan | |
| 4,430,859 A | 2/1984 | Hirsch | |
| 4,507,920 A | 4/1985 | Rau | |
| 4,620,416 A * | 11/1986 | Yip et al. | 60/384 |
| 4,665,695 A | 5/1987 | Rau et al. | |
| 5,050,696 A | 9/1991 | McGovern et al. | |
| 5,806,561 A * | 9/1998 | Pedersen et al. | 60/384 |
| 5,826,487 A * | 10/1998 | A'Hearn | 91/516 |
| 6,769,348 B2 * | 8/2004 | Hudson et al. | 91/516 |

* cited by examiner

*Primary Examiner*—Michael Leslie

(57) ABSTRACT

A fluid system comprises a static LS valve, a dynamic LS valve, a priority valve biased to preferentially supply pressurized fluid to both the static LS valve and the dynamic LS valve, and a signal-mimicking device fluidly coupled to a static LS port of the static LS valve, a dynamic LS port of the dynamic LS valve, and a dynamic LS pilot port of the priority valve for mimicking a static LS signal from the static LS port of the static LS valve into a dynamic LS signal from the dynamic LS port of the dynamic LS valve to produce a combined LS signal communicated to the dynamic LS pilot port of the priority valve. Such a fluid system may be applied to a steering system. An associated method is disclosed.

19 Claims, 2 Drawing Sheets

FLUID SYSTEM WITH SIGNAL-MIMICKING DEVICE AND ASSOCIATED METHOD

FIELD OF THE DISCLOSURE

The present disclosure relates to fluid systems, such as, for example, steering systems, and associated methods.

BACKGROUND OF THE DISCLOSURE

There are fluid systems, such as, for example, steering systems which have a priority valve. The priority valve supplies pressurized fluid to priority function(s) in preference to non-priority function(s). Some priority valves are designed to respond to a dynamic load sense signal rather than a static load sense signal (the term "load sense" is abbreviated herein as "LS"). The difference between a dynamic LS signal and a static LS signal relates to whether the associated LS circuit is configured for fluid flow. In the case of a dynamic LS signal, the associated dynamic LS circuit for carrying the dynamic LS signal is configured for flow of fluid therein whereas, in the case of a static LS signal, the associated static LS circuit for carrying the static LS signal is not configured for flow therein. As such, a dynamic LS circuit may be more responsive than a static LS circuit.

SUMMARY OF THE DISCLOSURE

According to the present disclosure, there is provided a fluid system and an associated method of operation. The fluid system comprises a static LS valve, a dynamic LS valve, a priority valve biased to preferentially supply pressurized fluid to both the static LS valve and the dynamic LS valve, and a signal-mimicking device fluidly coupled to a static LS port of the static LS valve, a dynamic LS port of the dynamic LS valve, and a dynamic LS pilot port of the priority valve for mimicking a static LS signal from the static LS port of the static LS valve into a dynamic LS signal from the dynamic LS port of the dynamic LS valve to produce a combined LS signal communicated to the dynamic LS pilot port of the priority valve. Such a fluid system thus provides for use of a single priority valve, designed to use a dynamic LS signal for purposes of enhanced responsiveness, not only with the dynamic LS signal of the dynamic LS valve but also with the static LS signal of the static LS valve.

The fluid system may be configured as a steering system which has an orbital steering control valve and a joystick steering control valve. The orbital steering control valve is configured as a dynamic LS valve and the joystick steering control valve is configured as a static LS valve. The signal-mimicking valve is fluidly coupled to a static LS port of the joystick steering control valve, a dynamic LS port of the orbital steering control valve, and a dynamic LS pilot port of the priority valve for mimicking a static LS signal from the static LS port of the joystick steering control valve into a dynamic LS signal from the dynamic LS port of the orbital steering control valve to produce a combined LS signal communicated to the dynamic LS pilot port of the priority valve.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
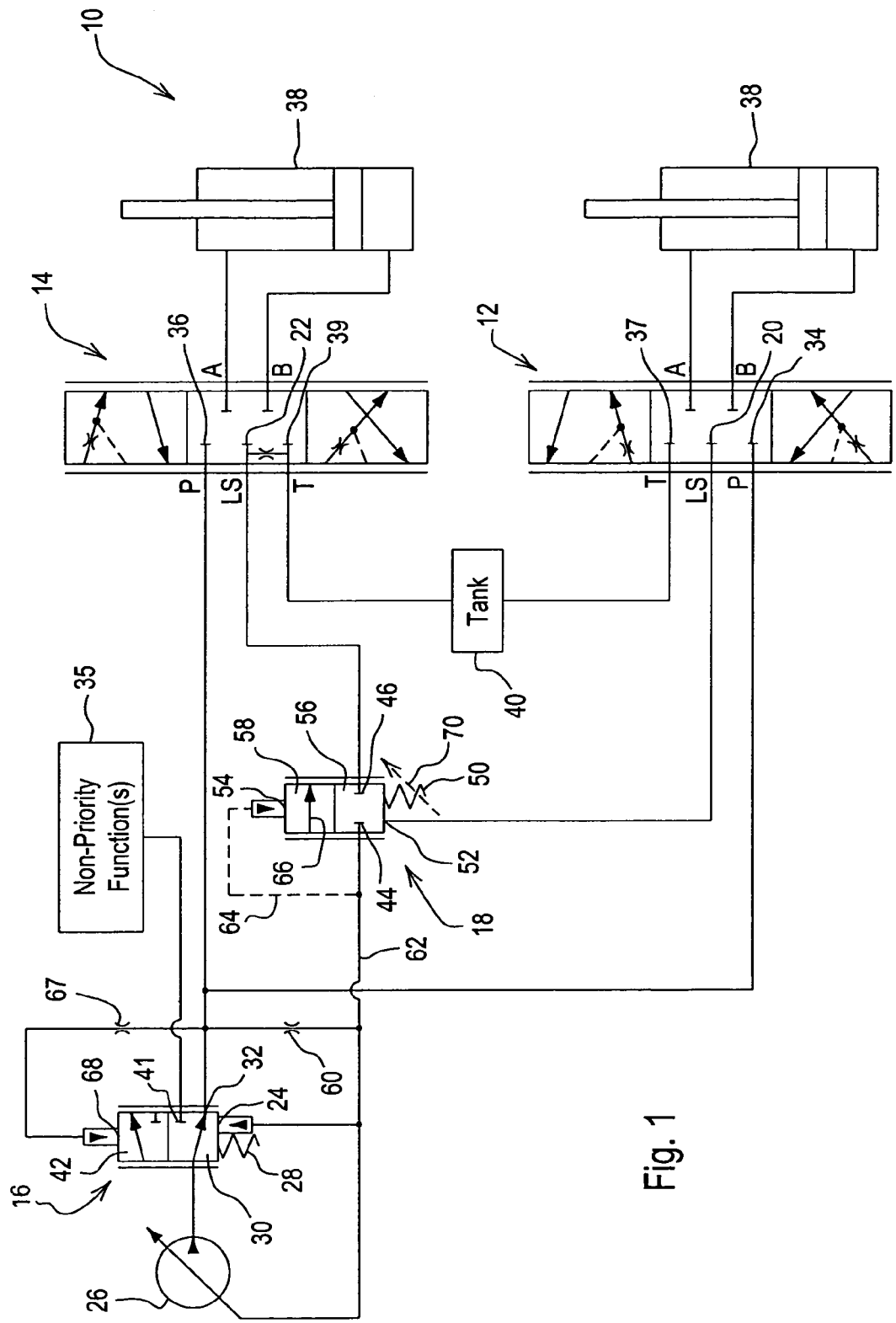
FIG. 1 is a schematic view of a fluid system.

Referring to FIG. 1, there is shown a fluid system 10. The fluid system 10 is configured such that a static LS valve 12 and a dynamic LS valve 14 can be used with a single priority valve 16 designed to use a dynamic LS signal.

The fluid system 10 comprises the static LS valve 12, the dynamic LS valve 14, the priority valve 16 which is biased to preferentially supply pressurized fluid to both the static LS valve and the dynamic LS valve, and a signal-mimicking device 18. The signal-mimicking device 18 is fluidly coupled to a static LS port 20 of the static LS valve 12, a dynamic LS port 22 of the dynamic LS valve 14, and a dynamic LS pilot port 24 of the priority valve 16 for mimicking a static LS signal from the static LS port 20 of the static LS valve 12 into a dynamic LS signal from the dynamic LS port 22 of the dynamic LS valve 14 to produce a combined LS signal communicated to the dynamic LS pilot port 24 of the priority valve 16. It is to be understood that either one or both of the static LS signal or the dynamic LS signal may be a zero LS signal (e.g., when no load is sensed at the respective valve 12,14) such that the combined signal represents the zero value of the static and/or dynamic LS signal(s).

In the fluid system 10, the priority valve 16 receives pressurized fluid (e.g., hydraulic fluid) from a source of pressurized fluid 26 (e.g., a variable displacement pump) responsive to LS control. The priority valve 16 is urged by a spring 28 and any pressure from the combined LS signal at the dynamic LS pilot port 24 to a priority position for supplying flow from a priority supply port 32 of the priority valve 16 to pressure ports 34, 36 of the valves 12, 14 in response to a demand therefrom in preference to non-priority function(s) 35 fluidly coupled to a non-priority supply port 41. The flow may be directed by the valves 12, 14 to one or more actuators 38, each of which may be in common with both valves 12,14 or associated with only one of the valves 12,14. Return flow from the actuators 38 is directed by the valves 12, 14 through tank ports 37, 39 to a tank 40. When there is a relatively low or no demand by the valves 12, 14, the priority valve 16 moves toward a non-priority position 42 to begin supplying pressurized fluid to the non-priority function(s) 35.

The signal-mimicking device 18 is configured, for example, as a signal-mimicking valve (e.g., a LS logic valve). In such a case, the valve 18 is fluidly coupled to the static LS port 20, the dynamic LS port 22, and the dynamic LS pilot port 24 for mimicking the static LS signal from the static LS port 20 into the dynamic LS signal from the dynamic LS port 22 to produce the combined LS signal communicated to the dynamic LS pilot port 24. The valve 18 is thus located downstream from the priority valve 16 and upstream from the valve 14 in a dynamic LS line 62 fluidly coupled to the ports 22, 24.

Illustratively, the valve 18 comprises a fluid inlet port 44, a fluid outlet port 46, a spring 50, and pilot ports 52, 54. The fluid inlet port 44 is fluidly coupled to both the dynamic LS pilot port 24 and the priority supply port 32. The fluid outlet port 46 is fluidly coupled to the dynamic LS port 22 of the dynamic LS valve 14. The spring 50 urges the signal-mimicking valve 18 toward a closed position 56 blocking flow between the fluid inlet and outlet ports 44, 46. The pilot port 52 is fluidly coupled to the static LS port 20 to urge the signal-mimicking valve toward the closed position 56 in response to the static LS signal. The spring 50 and the static LS signal cooperate to provide a closing force urging the valve 18 toward its closed position 56. The pilot port 54 is fluidly coupled to the priority supply port 32 to receive pressure therefrom to urge the signal-mimicking valve 18 from the closed position 56 toward an at least partially open position (between the closed position 56 and a fully open position 58) allowing at least partial flow from the fluid inlet port 44 to the fluid outlet port 46. Exemplarily, the valve 18 comprises a spool for movement between the positions 56, 58.

In operation, before application of pressure to the pilot port 54, the valve 18 assumes its normally closed position 56 due to spring 50 blocking communication between inlet and outlet ports 44, 46. When one or both of the valves 12, 14 issues a demand for fluid, the priority valve 16 responds by outputting fluid from its priority supply port 32. Much of the outputted fluid advances to the demanding pressure port(s) 34, 36. However, a dynamic LS portion of the fluid outputted from the port 32 will advance through an orifice 60 to a dynamic LS line 62 interconnecting the LS ports 22, 24 and in which the valve 18 is located. Fluid in the line 62 advances to the inlet port 44 and fills a pilot line 64. With sufficient pressure build-up in the pilot line 64, pressure communicated from the priority supply port 32 to the pilot port 54 at least partially opens a flow path 66 between the inlet and outlet ports 44, 46, allowing fluid to advance from the inlet port 44 through the flow path 66 to the outlet port 46 and on to the dynamic LS port 22.

The flow path 66 may be at least partially restricted in response to the closing force from the spring 50 and communication of a static LS signal from the static LS port 20 to the pilot port 52, resulting in a pressure build-up at the inlet port 44 indicative of the static LS signal. This pressure indicative of the static LS signal combines with the dynamic LS signal received from the dynamic LS port 22 of the dynamic LS valve 14 via the outlet port 46 to produce the combined LS signal. The combined LS signal is then communicated from the fluid inlet port 44 to the dynamic LS pilot port 24 of the priority valve 16. The priority valve 16 uses the combined LS signal to ensure that priority flow is given to the valves 12, 14.

If there is a decreased pressure or no pressure at the priority pilot port 24, pressure communicated through an orifice 67 to a non-priority pilot port 68 of the priority valve 16 will begin to shift the priority valve 16 toward its non-priority position for supply of fluid to the non-priority function(s) 35. A renewed demand by either of the valves 12,14 will cause the pressure at the non-priority pilot port 68 to drop, allowing the spring 28 to move the priority valve 16 back to its priority position 30 for supply of the demanding valve(s) 12, 14.

There may be a spring-setting adjuster 70 associated with the spring 50 for adjustment of a spring setting of the spring 50. By adjusting the spring setting on the valve 18, the margin setting (which may be referred to also as the margin pressure, the priority setting, or the priority pressure), and thus the priority, to the valves 12, 14 is also adjusted. The valve 18 thus provides a location downstream from the priority valve 16 for adjustment of the margin setting.

Figure 2:
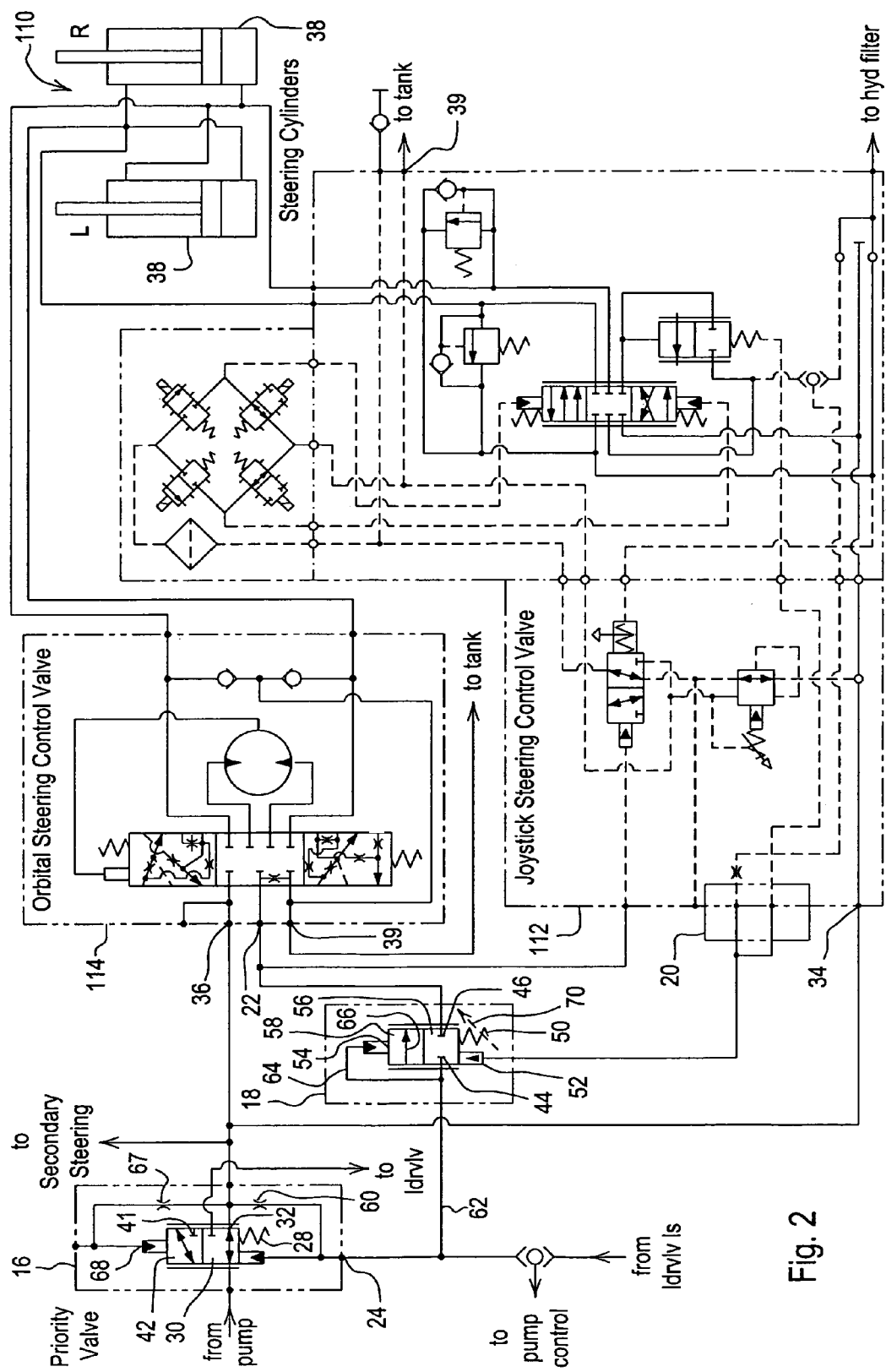
FIG. 2 is a schematic view of a steering system.

Referring to FIG. 2, there is shown the fluid system 10 embodied as a steering system 110. The steering system 110 may be used with a work vehicle such as, for example, an articulated loader having a front vehicle section articulated to a rear vehicle section for movement about an articulation axis relative to the rear vehicle section in response to actuation of left and right steering cylinders 38 extending between the front and rear vehicle sections. The cylinders 38 may be actuated by a joystick steering control valve 112 or an orbital steering control valve 114. The joystick steering control valve 112 is a static LS valve and is associated with a joystick of the vehicle 10 for operation thereby in response to manipulation of the joystick by an operator of the vehicle 10. The orbital steering control valve 114 is a dynamic LS valve and is associated with a steering wheel of the vehicle 10 for operation thereby in response to manipulation of the steering wheel by an operator of the vehicle 10. The priority valve 16 supplies pressurized fluid (e.g., hydraulic fluid) to the valves 112, 114 in preference to non-priority function(s) of the vehicle such as, for example, a loader valve ("Idrvlv" in FIG. 2) responsible for various loader operations (e.g., boom lift, bucket tilt) in the case where the vehicle 10 is an articulated loader.

The steering system 110 operates in a manner similar to that described above for the fluid system 10 such that the same reference numbers are used for similar components. As such, the joystick steering control valve 112 and the orbital steering control valve 114 may be substituted for the static LS valve 12 and the dynamic LS valve, respectively, in the discussion above for an explanation of the structure and operation of the steering system 112. Notably, the above explanation of the structure and operation of the signal-mimicking valve 18 as used in connection with the priority valve 16 applies also in the context of the steering system 110 with its valves 112, 114.

To highlight, the signal-mimicking valve 18 is fluidly coupled to a static LS port 20 of the joystick steering control valve 112, a dynamic LS port 22 of the orbital steering control valve 114, and a dynamic LS pilot port 24 of the priority valve 16 for mimicking a static LS signal from the static LS port 20 of the joystick steering control valve 112 into a dynamic LS signal from the dynamic LS port 22 of the orbital steering control valve 114 to produce a combined LS signal communicated to the dynamic LS pilot port 24 of the priority valve 16. To avoid unnecessary repetition, reference is made to the above discussion about the fluid system 10 for a more detailed explanation applicable to the structure and operation of the steering system 110 and components thereof.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method of operating a fluid system comprising a static LS valve, a dynamic LS valve, and a dynamic LS priority valve biased to preferentially supply pressurized fluid to both the static LS valve and the dynamic LS valve, the method comprising:

mimicking a static LS signal of the static LS valve into a dynamic LS signal of the dynamic LS valve to produce a combined LS signal, and communicating the combined LS signal to the dynamic LS priority valve.

2. The method of claim 1, wherein the static LS valve is a joystick steering control valve, the dynamic LS valve is an orbital steering control valve, and the mimicking comprises mimicking a static LS signal of the joystick steering control valve into a dynamic LS signal of the orbital steering control valve to produce the combined LS signal.

3. The method of claim 1, wherein the mimicking comprises a signal-mimicking valve mimicking the static LS signal into the dynamic LS signal to produce the combined LS signal.

4. The method of claim 3, wherein the mimicking comprises urging the signal-mimicking valve toward a closed position with the static LS signal and a spring.

5. The method of claim 4, wherein the mimicking comprises at least partially opening the signal-mimicking valve against a closing force from the static LS signal and the spring toward an at least partially open position with pressure from a priority supply port of the priority valve.

6. The method of claim 4, comprising adjusting a spring setting of the spring.

7. The method of claim 1, wherein:
the mimicking comprises:
at least partially opening a, flow path between a fluid inlet port of a signal-mimicking valve and a fluid outlet port of the signal-mimicking valve in response to communication of pressure from a priority supply port of the priority valve to a pilot port of the signal-mimicking valve;
at least partially restricting the flow path in response to communication of the static LS signal to another pilot port of the signal-mimicking valve, resulting in a pressure indicative of the static LS signal; and
combining the pressure indicative of the static LS signal with the dynamic LS signal received from a dynamic LS port of the dynamic LS valve via the fluid outlet port to produce the combined LS signal; and
the communicating comprises communicating the combined LS signal from the fluid inlet port to a dynamic LS pilot port of the priority valve.

8. A fluid system, comprising:
a static LS valve,
a dynamic LS valve,
a priority valve biased to preferentially supply pressurized fluid to both the static LS valve and the dynamic LS valve, and
a signal-mimicking device fluidly coupled to a static LS port of the static LS valve, a dynamic LS port of the dynamic LS valve, and a dynamic LS pilot port of the priority valve for mimicking a static LS signal from the static LS port of the static LS valve into a dynamic LS signal from the dynamic LS port of the dynamic LS valve to produce a combined LS signal communicated to the dynamic LS pilot port of the priority valve.

9. The fluid system of claim 8, wherein the signal-mimicking device is configured as a signal-mimicking valve.

10. The fluid system of claim 9, wherein the signal-mimicking valve comprises a spring urging the signal-mimicking valve toward a closed position.

11. The fluid system of claim 10, wherein the signal-mimicking valve comprises a spring-setting adjuster for adjusting a spring-setting of the spring.

12. The fluid system of claim 9, wherein the signal-mimicking valve comprises a pilot port fluidly coupled to the static LS port of the static LS valve to urge the signal-mimicking valve toward a closed position in response to the static LS signal.

13. The fluid system of claim 9, wherein the signal-mimicking valve comprises a pilot port fluidly coupled to a priority supply port of the priority valve to receive pressure therefrom to urge the signal-mimicking valve from a closed position toward an at least partially open position.

14. The fluid system of claim 9, wherein the signal-mimicking valve comprises:
a fluid inlet port fluidly coupled to both the dynamic LS pilot port of the priority valve and a priority supply port of the priority valve, the priority supply port fluidly coupled to a pressure port of the static LS valve and a pressure port of the dynamic LS valve,
a fluid outlet port fluidly coupled to the dynamic LS port of the dynamic LS valve,
a spring urging the signal-mimicking valve toward a closed position blocking flow between the fluid inlet and outlet ports of the signal-mimicking valve,
a pilot port fluidly coupled to the static LS port of the static LS valve to urge the signal-mimicking valve toward the closed position in response to the static LS signal, and
a pilot port fluidly coupled to the priority supply port of the priority valve to receive pressure therefrom to urge the signal-mimicking valve from the closed position toward an at least partially open position allowing at least partial flow from the fluid inlet port of the signal-mimicking valve to the fluid outlet port of the signal-mimicking valve.

15. A steering system, comprising:
a joystick steering control valve,
an orbital steering control valve,
a priority valve biased to preferentially supply pressurized fluid to both the joystick steering control valve and the orbital steering control valve, and
a signal-mimicking valve fluidly coupled to a static LS port of the joystick steering control valve, a dynamic LS port of the orbital steering control valve, and a dynamic LS pilot port of the priority valve for mimicking a static LS signal from the static LS port of the joystick steering control valve into a dynamic LS signal from the dynamic LS port of the orbital steering control valve to produce a combined LS signal communicated to the dynamic LS pilot port of the priority valve.

16. The steering system of claim 15, wherein the signal-mimicking valve comprises a spring urging the signal-mimicking valve toward a closed position.

17. The steering system of claim 15, wherein the signal-mimicking valve comprises a pilot port fluidly coupled to the static LS port of the joystick steering control valve to urge the signal-mimicking valve toward a closed position in response to the static LS signal.

18. The steering system of claim 15, wherein the signal-mimicking valve comprises a pilot port fluidly coupled to a priority supply port of the priority valve to receive flow therefrom to urge the signal-mimicking valve from a closed position toward an at least partially open position.

19. The steering system of claim 15, wherein the signal-mimicking valve comprises:
a fluid inlet port fluidly coupled to both the dynamic LS pilot port of the priority valve and a priority supply port of the priority valve, the priority supply port fluidly coupled to a pressure port of the joystick steering control valve and a pressure port of the orbital steering control valve,
a fluid outlet port fluidly coupled to the dynamic LS port of the orbital steering control valve,
a spring urging the signal-mimicking valve toward a closed position blocking flow between the fluid inlet and outlet ports of the signal-mimicking valve,
a pilot port fluidly coupled to the static LS port of the joystick steering control valve to urge the signal-mimicking valve toward the closed position in response to the static LS signal, and
a pilot port fluidly coupled to the priority supply port of the priority valve to receive pressure therefrom to urge the signal-mimicking valve from the closed position toward an at least partially open position allowing at least partial flow from the fluid inlet port of the signal-mimicking valve to the fluid outlet port of the signal-mimicking valve.

* * * * *